United States Patent Office 3,377,351
Patented Apr. 9, 1968

3,377,351
BENZAMIDOALKYLBENZENESULFONAMIDO-PYRIMIDINES AND ANALOGUES THEREOF
Erich Haack, Heidelberg, Ruth Heerdt, Mannheim, Felix H. Schmidt, Mannheim-Neuostheim, Kurt Stach, Mannheim, and Rudi Weyer, Frankfurt am Main-Unterliederbach, Germany, assignors to C. F. Boehringer & Soehne G.m.b.H., Mannheim-Waldhof, Germany, a corporation of Germany
No Drawing. Continuation-in-part of application Ser. No. 455,295, May 12, 1965. This application Sept. 23, 1966, Ser. No. 581,445
Claims priority, application Germany, May 20, 1964, B 76,848; Oct. 9, 1965, B 84,050
11 Claims. (Cl. 260—256.5)

ABSTRACT OF THE DISCLOSURE

A novel class of 2-benzene-sulfonamido-pyrimidines is disclosed. The said compounds constitute highly effective antidiabetic agents and the invention as disclosed includes antidiabetic compositions as well as a method for carrying out antidiabetic therapy. The 2-benzene-sulfonamido-pyrimidines have the following formula:

$$A-CO-N(R_2)-X-C_6H_4-SO_2-NH-\text{(pyrimidine)}-R_1$$

wherein X is alkylene containing 1 to 4 carbon atoms, A is substituted or unsubstituted alkyl, cycloalkyl, aryl, aralkyl, arylmercaptoalkyl or aryloxyalkyl, $R_1$ is substituted or unsubstituted alkyl, cycloalkyl, aryl, aralkyl, alkoxy, alkoxyalkyl or alkoxyalkoxy and $R_2$ is hydrogen, lower alkyl or substituted or unsubstituted aralkyl.

---

This application is a continuation-in-part of application Ser. No. 455,295, filed May 12, 1965, now abandoned.

This invention relates to novel 2-benzene-sulfonamido-pyrimidines and more particularly relates to novel 2-benzene-sulfonamido-pyrimidines and to anti-diabetic compositions containing said novel compounds.

Substituted 2-benzene-sulfonamido-pyrimidines having a blood sugar reducing action have been described in German patent specification No. 1,147,948, British patent specifications Nos. 913,716 and 939,608, and Belgian patent specifications Nos. 609,270; 622,085, and 622,086.

A primary object of the present invention is the development of a new series of therapeutically useful chemical compounds.

A further object of this invention is the development more particularly of a new group of chemical compounds characterized by antidiabetic activity.

A still further object of this invention is the development of a new series of therapeutically useful new chemical compounds capable of reducing blood sugar for a considerable period of time without any incidence of undesirable side effects.

These and other objects and advantages will be apparent from the description and claims which follow:

The novel 2-benzene sulfonamido-pyrimidine compounds of this invention are represented by the following structural formula:

$$A-CO-N(R_2)-X-C_6H_4-SO_2-NH-\text{(pyrimidine)}-R_1 \quad (I)$$

wherein X represents a straight or branched chain hydrocarbon radical containing 1 to 4 carbon atoms, A represents an unsubstituted or substituted alkyl, cycloalkyl, aryl, aralkyl, arylmercaptoalkyl or aryloxyalkyl radical, $R^1$ is an unsubstituted or substituted alkyl, cycloalkyl, aryl, aralkyl, alkoxy, alkoxyalkyl or alkoxyalkoxy radical, and $R_2$ is hydrogen lower alkyl or an unsubstituted or substituted aralkyl radical.

A preferred group of compounds are represented by the following formula:

$$Y-C_6H_3(X^1)-CO-NH-(CH_2)_2-C_6H_4-SO_2-NH-\text{(pyrimidine)}-R_1$$

wherein $R_1$ represents alkyl having 3–5 carbon atoms, $X^1$ is alkoxy having 1–3 carbon atoms and Y is hydrogen, halogen, alkyl or alkoxy having 1–3 carbon atoms.

The compounds of the present invention can be prepared by any of the conventional methods employed for the preparation of sulfonamides.

The 2-benzene-sulfonamido-pyrimidines of the invention can, for instance, be prepared by any of the alternative procedures which follow:

(a) Reaction of compounds of the formula:

$$A-CO-N(R_2)-X-C_6H_4-S(O)_nCl \quad (II)$$

wherein A, $R_2$, and X have the afore-indicated meanings and $n$ is 0, 1 or 2, with 2-amino-pyrimidines of the formula:

$$H_2N-\text{(pyrimidine)}-R_1 \quad (III)$$

wherein $R_1$ has the above indicated meaning, and the products obtained oxidized, if necessary, to the corresponding sulfonamides;

(b) Reaction of benzene-sulfonyl-guanidines of the formula:

$$A-CO-N(R_2)-X-C_6H_4-SO_2-NH-C(=NH)NH_2 \quad (IV)$$

wherein A, $R_2$ and X have the above indicated meanings, with compounds of the formula:

$$Y-CO-CH(R_1)-CO-Y' \quad (V)$$

wherein $R_1$ is as above defined and Y and Y' each represents hydrogen or an alkoxy radical, or with a functional derivative thereof, and thereafter converting the pyrimidine derivative thus produced, which may be substituted in the 4- and/or 6-position by hydroxyl groups, into the corresponding pyrimidine derivative which are unsubstituted in the 4- and 6-positions by first forming the halogen compounds and then subjecting this to a reductive dehalogenation;

(c) Acylation of compounds of the formula:

$$R_2-NH-X-C_6H_4-SO_2-NH-\text{(pyrimidine)}-R_1 \quad (VI)$$

wherein X, $R_1$ and $R_2$ are as above defined, with a reactive derivative of an acid of the formula A—COOH, wherein A has the afore-indicated meaning;

(d) Reaction of sulfonamides of the formula:

$$A-CO-N(R_2)-X-C_6H_4-SO_2-NH_2 \quad (VII)$$

wherein A, $R_2$ and X have the afore-indicated meanings, with pyrimidine derivatives of the formula:

$$Z-\text{(pyrimidine)}-R_1 \quad (VIII)$$

wherein R₁ is as above defined and Z is a reactive ester group or a low molecular weight trialkylamino group; or (e) Reaction of a sulfonic acid of the formula:

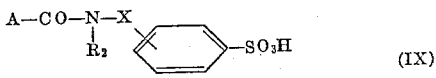

(IX)

wherein A, R₂ and X are as above defined, with 2-acetyl-aminopyrimidines of the formula:

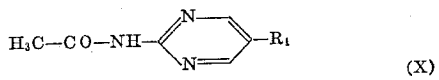

(X)

wherein R₁ has the above indicated meaning.

The reaction of compounds (II) and (III) is advantageously carried out in an inert solvent in the presence of a base, preferably pyridine or trimethylamine. However, it is also possible to carry out the reaction with a double excess of the amino-pyrimidine in order to bind the hydrogen chloride formed by the reaction. The subsequent oxidation of the sulfenamides or sulfinamides to the desired sulfonamides is carried out in the usual manner, for example, by treatment with hydrogen peroxide, potassium permanganate or nitric acid.

The benzene-sulfonyl-guanidines (IV) used as starting materials can be obtained, for example, by melting together the appropriate benzene-sulfonamides with guanidine carbonate. The subsequent condensation of these compounds (IV) with the β-dicarbonyl compounds (V) can be carried out, for example, by means of an alkali metal alcoholate in alcohol. The β-dicarbonyl compounds (V) are in this connection used either in free form or in the form of functional derivatives thereof, such as the acetals. They can, however, also be prepared in a "one pot process" by the Vilsmeier method from aldehyde acetals, acid chlorides and dialkyl formamides. If, instead of the dialdehydes, there are used the appropriately substituted malonic acid esters or malonic aldehydes or their functional derivatves, then the hydroxyl groups in the 4- and/or 6-positions of the pyrimidine ring msut subsequently be replaced by chlorine as for example by treatment with an inorganic acid chloride, this chlorine being readily removed reductively with, for example, zinc dust.

The acylation of the compounds (VI) is carried out in the usual maner, for example, by reaction with the appropriate acid halides or anhydrides, preferably in the presence of an acid acceptor, or by treatment with reactive acid esters.

Preferred starting materials of general formula (VIII) are, in particular, 2-halopyrimidines. They can be prepared, for example, by the reaction of 2-hydroxy-pyrimidines with excess phosphorous oxychloride. The condensation of the compounds (VIII) with the benzene-sulfonamides (VII) preferably takes place in the presence of a base, such as potassium carbonate. Instead of the 2-halopyrimidines, the corresponding trialkylamino-pyrimidines can also be reacted with the sulfonamides, with the formation of trialkylamines, to give the desired benzene-sulfonamido-pyrimidines.

The reaction of the sulfonic acids (IX) with the 2-acetylamino-pyrimidines (X) is carried out, using Freudenberg's method, by heating in absolute methanol, the acetyl residue split off thereby, being distilled off in the form of the methyl ester.

The invention includes not only the compounds in their free form but their alkali salts as well. The salts are prepared in the conventional manner and preferably in the form of the sodium, potassium, and ammonium salts. Salt formation takes place by virtue of the fact that the NH group directly adjacent to the SO₂ group exhibits a strongly acid effect due to the vicinity of the said SO₂ group and therefore in an alkaline medium a proton is split off and the salt formed.

Salts of this type and particularly of sulfonyl ureas are known and have been described, for example, in Netherlands Patent 6,411,087.

The following examples are given in order to more clearly disclose the nature of the present invention. It should be understood, however, that the examples are not intended to be a limitation on the scope of the invention.

Example 1.—2-[4-(β-benzamido-ethyl)-benzene-sulfonamido]-5-propoxy-pyrimidine 4 g., 2-amino-5-propoxy-pyrimidine and 17 g. benzamido-ethylbenzene-sulfochloride were added to 60 ml. methylene chloride. Trimethylamine was introduced into the resulting mixture, with stirring. After a reaction time of 15 minutes, solution had taken place and thereafter the reaction product slowly separated out. Trimethylamine was passed in for a further 1.5 hours. The precipitate was filtered off with suction and heated for 1 hour on a water bath with 100 ml. 10% sodium hydroxide solution. The solution was subsequently neutralized with dilute hydrochloric acid, an oil thereby being formed. The supernatant water was poured off and the remaining oil stirred with ethyl acetate. The 2-[4-(β-benzamido-ethyl)-benzene-sulfonamido]-5-propoxy-pyrimidine which was thereby formed crystallized out. Following recrystallization from butanol, the 2-[4-(β-benzamido-ethyl)-benzene-sulfonamido]-5-propoxy-pyramidine melted at 194° C.

The following compounds were prepared by an analogous procedure:

2 - [4 - (β - benzamido - ethyl) - benzene - sulfonylamido]-5-methoxyethoxy-pyrimidine; M.P. 186–187° C.;

2 - [4 - (β - benzamido - ethyl) - benzene - sulfonylamido]-5-phenyl-pyrimidine; M.P. 230° C.;

2 - [4 - (β - p - chlorobenzamido - ethyl) - benzene - sulfonylamido]-5-phenyl-pyrimidine; M.P. 228–230° C.;

2 - [4 - (β - benzamido - ethyl) - benzene - sulfonylamido]-5-(p-chlorophenyl)-pyrimidine; M.P. 230° C.;

Example 2.—2-[4-(β-benzamido-ethyl)-benzene-sulfonylamido]-5-methoxypyrimidine 4 g. 2-amino-5-methoxy-pyrimidine in 33 ml. absolute pyridine were reacted with 10.3 g. benzamido-ethylbenzene-sulfochloride, while stirring, the reaction mixture being cooled in a mixture of ice and salt. After 2 hours, the reaction mixture was allowed to warm up to room temperature and the stirring continued for a further 5 hours. The reaction mixture was allowed to stand overnight, and then it was heated to 100° C. for 1 hour. The heated mixture was evaporated in a vacuum and the residue stirred with dilute hydrochloric acid in an ice bath. The acidic solution was decanted off and the residue dissolved in ammonia and reprecipitated with acetic acid. The 2-[4-(β-benzamido-ethyl-benzene-sulfonylamido]-5-methoxy-primidine thus obtained had a melting point of 198–200° C.

The following compounds were prepared in an analogous manner:

2 - [4 - (β - benzamido - ethyl) - benzene - sulfonamido] - 5-butoxy-pyrimidine; M.P. 195–196° C. (recrystallized from propanol);

2 - [4 - (β - benzamido - ethyl) - benzene - sulfonamido] - 5-propyl-pyrimidine; M.P. 207–208° C. (recrystallized from ethanol);

2 - [(β - p - chlorobenzamido - ethyl) - benzene - sulfonamido]-5-(β-methoxy-ethoxy)-pyrimidine; M.P. 193–196° C. (recrystallized from ethanol);

2 - [4 - (β - benzamido - ethyl) - benzene - sulfonamido] - 5-(β-ethoxy-ethoxy)-pyrimidine; M.P. 182° C. (recrystallized from propanol);

2 - [4 - (β - benzamido - ethyl) - benzene - sulfonamido] - 5-ethoxy-pyrimidine; M.P. 221–222° C. (recrystallized from glacial acetic acid);

2 - [4 - (β - benzamido - methyl) - benzene - sulfonamido]-5-propyl-pyrimidine; M.P. 242° C. (purified by dissolving in ammonia and precipitating with hydrochloric acid);

2 - [4 - (β - isovalerianylamido - ethyl) - benzene - sulfonamido]-5-propyl pyrimidine; M.P. 179–180° C. (recrystallized from ethanol);

2 - [4 - (β - benzamido - ethyl) - benzene - sulfonamido] - 5-ethyl-pyrimidine; M.P. 222° C. (recrystallized from ethanol);

2 - [4 - (β - benzamido - ethyl) - benzene - sulfonamido] - 5-isobutyl-pyrimidine; M.P. 222° C. (recrystallized from ethanol);

2 - [4 - (β - p - chlorobenzamido - ethyl - benzene - sulfonamido]-5-n-propyl-pyrimidine; M.P. 227° C. (recrystallized from glacial acetic acid.);

2 - [4 - (β - benzamido - ethyl) - benzene - sulfonamido] - 5-n-butyl-pyrimidine; M.P. 181° C. (recrystallized from ethanol);

2 - [4 - (β - benzamido - ethyl) - benzene - sulfonamido] - 5-cyclohexyl-pyrimidine; M.P. 233° C. (recrystallized from ethanol);

2 - [4 - (β - benzamido - ethyl) - benzene - sulfonamido] - 5-(3-pentyl)-pyrimidine; M.P. 176–179° C. (recrystallized from ethanol);

2 - [4 - (β - benzamido - ethyl) - benzene - sulfonamido] - 5-benzyl-pyrimidine; M.P. 204–205° C. (recrystallized from ethanol);

2 - [4 - (β - benzamido - ethyl) - benzene - sulfonamido] - 5-(hexahydrobenzyl)-pyrimidine; M.P. 196° C. (recrystallized from ethanol).

Example 3.—2-[4-(β-benzamido-ethyl-benzene-sulfonamido]-5-(β-methoxy-ethoxy)-pyrimidine 10 g. phosgene were introduced, with stirring and at a temperature of 0–5° C., into a solution of 7.3 g. dimethyl formamide in 50 ml. dry methylene chloride. 12.6 g. β-methoxy-ethoxy-acetaldehyde-dimethoxy-ethyl acetal were subsequently added thereto dropwise. The reaction mixture was boiled for 5 hours, while stirring, then cooled, the pH adjusted to 8.0 using therefor a 20–30% solution of sodium methylate, the salt filtered off with suction and the filtrate evaporated in a vacuum on a water bath (temperature <60° C.). The residue was introduced dropwise, with stirring, into a boiling mixture of 2.3 g. sodium in 50 ml. absolute ethanol and 17.3 g. 4-(β-benzamido-ethyl)-benzene-sulfonyl-guanidine (M.P. 265° C.; prepared from 4-(β-benzamido-ethyl)-benzene-sulfonamide by melting with guanidine carbonate). The reaction mixture was boiled under reflux, while stirring, for 5 hours and subsequently poured into water. Undissolved material was filtered off with suction, the filtrate acidified, the reaction product filtered off with suction and recrystallized from ethanol. The 2-[4-(β-benzamido-ethyl)-benzene - sulfonamido] - 5 - (β - methoxy - ethoxy) - pyrimidine thereby obtained melted at 187° C.

The following compounds were also obtained in an analogous manner:

2 - [4 - (benzamido - methyl) - benzene - sulfonamido] - 5-(β-methoxy-ethoxy)-pyrimidine; M.P. 195–197° C. from 4-(benzamido-methyl)-benzene-sulfonyl-guanidine; M.P. 264–265° C.);

2 - [4 - (β - acetylamido - ethyl) - benzene - sulfonamido]-5-propyl-pyrimidine; M.P. 182–183° C. (recrystallized from ethanol);

2 - [4 - (β - benzamido - ethyl) - benzene - sulfonamido]-5-isopropyl-pyrimidine; M.P. 189° C. (recrystallized from propanol).

Example 4.—2 - [4 - (β - p - chlorobenzamido - ethyl)-benzene-sulfonamido]-5-butoxy-pyrimidine 1.4 g. 2-[4-(β-amino-ethyl)-benzene-sulfonamido]-butoxy-pyrimidine (M.P. 223–225° C.) were dissolved in 2 ml. 2 N sodium hydroxide solution and mixed with 0.7 g. p-chlorobenzoyl chloride. The reaction mixture was stirred for 3 hours at 40° C. A further 0.2 ml. 2 N sodium hydroxide solution and a further 0.1 g. p-chlorobenzoyl chloride were added thereto and heating continued for another 2 hours. The reaction mixture was then filtered with suction, the residue washed with ether and dissolved in a solution of sodium carbonate. Carbon was added to the lakaline solution which was then filtered. The filtrate was mixed with hydrochloric acid and 2-[4-(β-p-chlorobenzamido - ethyl) - benzene - sulfonamido] - 5 - butoxy - pyrimidine precipitated out; M.P. 202° C. after recrystallization from methanol.

In an analogous manner, 2-[4-(β-hexahydrobenzamido-ethyl) - benzene - sulfonamido] - 5 - propoxy - pyrimidine was obtained from 2 - (amino - ethyl - benzene - sulfonamido) - 5 - propoxy - pyrimidine (M.P. 207–210° C.) and hexahydrobenzoyl chloride. This compound had a melting point of 219° C. after recrystallization from ethanol.

The following compounds were also obtained in an analogous manner:

2 - [4 - (β - m - toluylamido - ethyl) - benzene - sulfonamido]-5-n-propyl-pyrimidine; M.P. 188–190° C. (recrystallized from propanol);

2 - [4 - (β - phenylmercapto - acetamido - ethyl) - benzene - sulfonamido - 5 - n - propyl - pyrimidine; M.P. 193–194° C. (recrystallized from ethanol);

2 - [4 - (β - m - chlorobenzamido - ethyl) - benzene - sulfonamido]-5-isobutyl-pyrimidine; M.P. 173° C. (recrystallized from ethanol);

2 - [4 - (β - p - methoxybenzamido - ethyl) - benzene - sulfonamido]-5-isobutyl-pyrimidine; M.P. 216° C. (recrystallized from ethanol);

2 - [4 - (β - o - methoxy - benzamido - ethyl) - benzene-sulfonamido]-5-isobutyl-pyrimidine; M.P. 155–157° C.; the compound was isolated as the ammonium salt and recrystallized from water and the free compound liberated by the addition of hydrochloric acid;

2 - [4 - (β - m - trifluoromethyl - benzamido - ethyl) - benzene - sulfonamido] - 5 - isobutyl - pyrimidine; M.P. 198–202° C. (purified by precipitation from solution in sodium carbonate by the addition of hydrochloric acid);

2 - [4 - (β - hexahydrobenzamido - ethyl) - benzene - sulfonamido] - 5 - isobutyl-pyrimidine; M.P. 186° C. (recrystallized from ethanol);

2 - [4 - (β - m - methoxy - benzamido - ethyl) - benzene-sulfonamido] - 5 - isobutyl - pyridine; M.P. 148–150° C. (recrystallized from ethanol);

2 - [4 - (β - m - toluylamido - ethyl) - benzene - sulfonamido] - 5 - isobutyl - pyrimidine; M.P. 175–177° C. (recrystallized from ethanol);

2 - [4 - (β - o - toluylamido - ethyl) - benzene - sulfonamido] - 5 - isobutyl - pyrimidine; M.P. 159–160° C. (recrystallized from ethanol);

2 - [4 - (β - m - fluoro - benzamido - ethyl) - benzene - sulfonamido] - 5 - isobutyl - pyrimidine; M.P. 202–203° C. (recrystallized from ethanol);

2 - [4 - β - o - ethoxy - benzamido - ethyl) - benzene - sulfonamido] - 5 - isobutyl - pyrimidine; M.P. 145–147° C. (recrystallized from ethanol);

2 - [4 - (β - methoxy - benzamido - ethyl) - benzene - sulfonamido] - 5 - (2 - butyl) - pyrimidine; M.P. 144–147° C. (recrystallized from ethanol);

2 - [4 - (β - methoxy - benzamido - ethyl) - benzene - sulfonamido] - 5 - (3 - methyl - butyl) - pyrimidine; M.P. 157–158° C. (recrystallized from ethanol);

2 - [4 - (β - phenylmercapto - acetamido - ethyl) - benzene - sulfonamido] - 5 - isobutyl-pyrimidine; M.P. 174° C. (recrystallized from ethanol);

2 - [4 - (β - 2' - naphthoylamido) - ethyl - benzene - sulfonamido] - 5 - isobutyl - pyrimidine; M.P. 198° C. (recrystallized from ethanol);

2 - [4 - (β - benzamido - ethyl) - benzene - sulfonamido] - 5 - (2 - butyl) - pyrimidine; M.P. 203–205° C. (recrystallized from ethanol).

Example 5.—2-[4-(β-benzamido-ethyl)-benzene-sulfonamido]-5-isobutyl-pyrimidine 0.95 g. of the sodium salt of 4-(β-benzamido-ethyl)-benzene-sulfonamide and 0.5 g. 2-chloro-5-isobutyl-pyrimidine were slowly heated to 240° C. The two substances reacted during the melting and were kept for half an hour at 220–240° C. After cooling the reaction mixture was dissolved in a diluted sodium hydroxide solution, filtered and precipitated with hydrochloric acid. The 2-[4-(β-benzamido-ethyl)-benzene-sulfonamido]-5-isobutyl-pyrimidine was recrystallized from ethanol and melted at 217° C. (yield 39%).

In an analogous manner there was obtained 2-[4-(β-o-methoxy-benzamido-isopropyl)-benzene-sulfonamido)-5-isobutyl-pyrimidine; M.P. - 142–144° C. (recrystallized from ethanol).

Example 6.—2-[4-(β-benzoyl-N-methylamino-ethyl)-benzene-sulfonamido]-5-isobutyl-pyrimidine 2 g. 2-amino-5-isobutyl-pyrimidine were dissolved in 15 ml. anhydrous pyridine and mixed, with ice cooling, with 4.9 g. 4-(β-benzoyl-N-methylamino-ethyl)-benbene-sulfochloride (oil; prepared from N-methylaminoethyl-benzene by sulfochlorination with chlorosulfonic acid). The reaction mixture was allowed to stand overnight and then heated for one hour on a water bath. The reaction mixture was then evaporated in a vacuum and the residue taken up in a mixture of dilute sodium carbonate solution and ammonia. The solution thus produced was filtered over charcoal and the filtrate acidified with hydrochloric acid. The precipitated substance was then recrystallized from alcohol. There was obtained 2-[4-(β-benzoyl-N-methylamino-ethyl)-benzene-sulfonamide]-5-isobutyl-pyrimidine having a melting point of 170–172° C.

Example 7.—2-[4-(β-2'-methoxy-5'-chlorobenzoyl-N-methylamino-ethyl)-benzene-sulfonamido]-5-isobutyl-pyrimidine 1.8 g. 5-chloro-2-methoxy-benzoyl chloride were added, with stirring, to 3 g. 2-[4-(β-N-methylamino-ethyl)-benzene-sulfonamido]-5-isobutyl-pyrimidine in 13 ml. anhydrous pyridine and allowed to stand overnight. The reaction mixture was then heated for one hour at 100° C., allowed to cool and poured on to ice. The precipitated material was filtered off with suction, taken up in a solution of sodium carbonate and again precipitated out with hydrochloric acid. The product was finally recrystallized from methanol. There was thereby obtained 2-[4-(β-2'-methoxy-5'-chlorobenzoyl-N-methylaminoethyl)-benzene-sulfonamido]-5-isobutyl-pyrimidine having a melting point of 186° C.

The following method was followed in the preparation of the starting material:

15 g. 4-(β-acetyl-N-methylamino-ethyl)-benzene-sulfonamide (prepared by the reaction of 4-(β-acetyl-N-methylamino-ethyl)-benzene with chlorosulfonic acid and amidation of the sulfochloride obtained; M.P. 149–150° C.) were mixed with 10 g. 2-chloro-5-isobutyl-pyrimidine and 8.1 g. potassium carbonate and slowly heated up to 190–200° C. After heating for two hours, the reaction mixture was allowed to cool and the melt taken up in water. The resulting solution was treated with animal charcoal, filtered and the 2-[4-(β-acetyl-N-methylaminoethyl)-benzene-sulfonamido]-5-isobutylpyrimidine which formed precipitated out by the addition of hydrochloric acid; M.P. 193–194° C. 15.9 g. of this acetyl compound were dissolved in 60 ml. 2 N sodium hydroxide solution and boiled under reflux for 7 hours. The reaction mixture was then cooled and adjusted to pH 7 with 2 N hydrochloric acid. The 2-[4-(β-N-methylamino-ethyl)-benzene-sulfonamido]-5-isobutyl-pyrimidine obtained in this manner melted at 213–215° C.

The following compounds were prepared in an analogous manner:

2-[4-(β-5'-methyl-2'-methoxybenzoyl-N-methylamino-ethyl)-benzene-sulfonamido]-5-isobutyl-pyrimidine; M.P. 147–149° C.;

2-[4-(β-o-methoxybenzoyl-N-methylamino-ethyl)-benbene-sulfonamido]-5-isobutyl-pyrimidine; M.P. 169–170° C.; and 2-[4-(β-m-chlorobenzoyl-N-methylamino-ethyl)-benzene-sulfonamide]-5-isobutyl-pyrimidine; M.P. 174–176° C.

Example 8.—2-[4-β-2'-methoxy-5'-chlorobenzoyl-N-ethylaminoethyl)-benzene-sulfonamido]-5-isobutyl-pyrimidine 1.7 g. 5-chloro-2-methoxy-benzoyl chloride were added, with stirring, to 3 g. 2-[4-(β-N-ethylamino-ethyl)-benzenesulfonamido]-5-isobutyl-pyrimidine in 30 ml. anhydrous pyridine. The reaction mixture was then left to stand overnight, subsequently heated to 100° C. for one hour, allowed to cool and poured onto ice. The precipitated material was filtered off with suction, dissolved in a solution of sodium carbonate and precipitated again with hydrochloric acid. It was thereafter recrystallized twice from isopropanol. There was thusly obtained 2-[4-(β-2'-methoxy-5'-chlorobenzoyl N-ethylamino-ethyl)-benzene-sulfonamido]-5-isobutyl-pyrimidine having a melting point of 148–150° C.

The following method was used for the preparation of the starting material:

10.4 g. 4-(β-acetyl-N-ethylamino-ethyl)-benzene-sulfonamide (prepared by the reaction of 4-(β-acetyl-N-ethyl-amino-ethyl)-benzene with chlorosulfonic acid and amidation of the sulfochloride so obtained; M.P. 180–181° C.) were mixed with 6.6 g. 2-chloro-5-isobutyl-pyrimidine and 5.3 g. potassium carbonate and slowly heated up to 200° C. After heating for 2 hours, the reaction mixture was allowed to cool and the melt taken up in water. The solution was then treated with animal charcoal, filtered and the 2-[4-β-acetyl-N-ethylamino-ethyl-benzene-sulfonamido]-5-isobutyl-pyrimidine formed precipitated out with hydrochloric acid; M.P. 165–168° C. The acetyl compound was subsequently heated for 8 hours with 3 mol 2 N sodium hydroxide solution whereby 2-[4-(β-N-ethylamino-ethyl-benzene-sulfonamido]-5-isobutyl-pyrimidine; M.P. 238–240° C. was formed.

Example 9.—2-[3-β-m-fluorbenzamido-ethyl)-benzene-sulfonamido]-isobutyl-pyrimidine 3 g. 3-(β-m-fluorbenzamido-ethyl)-benzene sulfonamide was thoroughly mixed with 1.6 g. 2-chlor-5-isobutyl-pyrimidine and 1.3 g. potassium carbonate and the mixture thereafter heated in an oil bath for 3 hours at 180° C. Following cooling, the melt was taken up in dilute soda lye and the solution extracted with ether. The alkaline solution was treated with hydrochloric acid and the precipitated material recovered and recrystallized from acetic ester. The 2-[3-β-m-fluorbenzamido-ethyl)-benzene-sulfonamido]-isobutyl-pyrimidine thereby formed melted at 158° C.

Example 10

A procedure analogous to that disclosed in Example 4 was followed to produce the following compounds:

2-[4-(β-3-chlor-2-methoxy-benzamido-ethyl)-benzenesulfonamido]-5-isobutyl-pyrimidine; melting point 171° C. (sodium salt recrystallized from water);

2-[4-(β-3-methyl-2-methoxy-benzamido-ethyl)-benzenesulfonamido]-5-isobutylpyrimidine; M.P. 178–179° C. (recrystallized from ethanol);

2-[4-(β-5-methyl-2-methoxy-benzamido-ethyl)-benzenesulfonamido]-5-isobutyl-pyrimidine; M.P. 156–157° C. (recrystallized from ethanol);

2-[4-(β-5-brom-2-methoxy-benzamido-ethyl)-benzenesulfonamido]-5-isobutyl-pyrimidine; M.P. 166–167° C. (recrystallized from propanol);

2-[4-(β-5,2-dimethoxy-benzamido-ethyl)-benzenesulfonamido]-5-isobutyl-pyrimidine; M.P. 149–152° C. (recrystallized from ethanol);

2-[4-(β-5-fluor-2-methoxy-benzamido-ethyl)-benzenesulfonamide]-5-isobutyl-pyrimidine; M.P. 172–174° C. (recrystallized from ethanol);

2 - [4 - (β - 5 - chlor-2-ethoxy-benzamido-ethyl)-benzene-sulfonamido] - 5 - isobutyl-pyrimidine; M.P. 155–157° C. (recrystallized from ethanol).

Example 11.—2-[4(β-o-methoxy-benzamido-ethyl)-benzene-sulfonamido]-5-propyl-pyrimidine To a solution of 2 g. 2-[4-(β-amino-ethyl)-benzene-sulfonamido]-5-propyl-pyrimidine in 6 ml. pyridine 1 ml. of o-methoxy-benzylochloride was added. The reaction mixture was left at room temperature for 12 hours and then heated for ½ hour on a water bath. After cooling, the reaction mixture was poured on ice and acidified by means of hydrochloric acid. The precipitate was filtered off with suction and thereafter dissolved in an aqueous sodium carbonate solution. Carbon was added to the alkaline solution which was then filtered. The filtrate was acidified by means of hydrochloric acid and 2-[4-(β-o-methoxy-benzamido-ethyl)-benzene - sulfonamido]-5-propyl-pyrimidine was obtained in 70% yield; M.P. 174° C.

The following compounds were also obtained in an analogous manner:

2-[4-(β - phenoxy-acetamido-ethyl)-benzene-sulfonamido]-5-isobutyl-pyrimidine; M.P. 166–170° C. (recrystallized from ethanol);

2-[4-(β-2,6-dimethoxy - benzamido-ethyl)-benzene-sulfonamido]-5-isobutyl-pyrimidine; M.P. 170–171° C. (recrystallized from ethanol);

2-[4-(β-o-methoxy - benzamido - ethyl)-benzene-sulfonamido]-5-isobutoxy-pyrimidine; M.P. 192–195° C. (recrystallized from a mixture of methanol and dimethylformamide);

2-[4-(β-2-methoxy-5-chloro - benzamido - ethyl)-benzene-sulfonamido]-5-isobutyl-pyrimidine; M.P. 166–167° C. (purified by precipitation from a solution in sodium carbonate by addition of hydrochloric acid).

The blood sugar reducing activities of some of the new 2-benzene-sulfonamido-pyrimidines were compared with that of the known compounds, i.e., the 2-benzene-sulfonamido-5-methoxy-ethoxy-pyrimidine, $N_1$-sulfanilyl-$N_2$-(n-butyl)-urea and $N_1$-(p - toluene - sulfonyl)-$N_2$-(n-butyl)-urea. The blood sugar reducing activity was measured in the rabbit following i.v. administration of the test compounds. The data set out in Table I which follows represent those compounds having the relative blood sugar reducing activity of at least 80 compared to the blood sugar reducing activity of $N_1$-sulfanilyl-$N_2$-(n-butyl)-urea. The increase in activity of the compounds of the invention as compared to $N_1$-(p-toluene - sulfonyl)-$N_2$-(n-butyl)-urea amounted to at least 8-fold, the latter being the case also in the comparison experiments with 2-benzene-sulfonamido-5-methoxyethoxy pyrimidine. The most effective compounds of the invention which were employed in testing, i.e., 2-[4-(β-benzamido-ethyl)-benzene-sulfonamido]-5-isobutyl-pyrimidine, 2-[4-(β-m-chlorobenzamido-ethyl)-benzene-sulfonamido]-5-isobutyl-pyrimidine, 2-[4-(β-o-methoxybenzamido-ethyl)-benzene-sulfonamido]-5-isobutyl-pyrimidine, and 2-[4-(β-m-trifluoromethyl-benzamido-ethyl)-benzene-sulfonamido]-5-isobutyl-pyrimidine, 2-[4-(β-o-ethoxy-benzamido-ethyl)-benzene-sulfonamido]-5-isobutyl-pyrimidine, 2-[4-(β-o-methoxybenzamido-ethyl)-benzene-sulfonamido]-5-(3-methyl-butyl)-pyrimidine, 2-[4-(β-2-methoxy-5-chloro-benzamido-ethyl)-benzene-sulfonamido]-5-isobutyl-pyrimidine, 2-[4-(β-5-methyl-2-methoxy-benzamido-ethyl)-benzene-sulfonamido]-5-isobutyl-pyrimidine, 2-[4-(β-5-bromo-2-methoxy-benzamido-ethyl)-benzene-sulfonamido]-5-isobutyl-pyrimidine, 2-[4-(β-5,2-dimethoxy-benzamido-ethyl)-benzene-sulfonamido]-5-isobutyl-pyrimidine, 2-[4-(β-5-fluoro-2-methoxy-benzamido-ethyl)-benzene-sulfonamido]-5-isobutyl-pyrimidine, and 2-[4-(β-5-chloro-2-ethoxy-benzamido-ethyl)-benzene-sulfonamido]-5-isobutyl-pyrimidine, demonstrated activity amounting to at least 40 times that of the 2-benzene-sulfonamido-5-methoxy-ethoxy-pyrimidine.

The therapeutic range of the above compounds is particularly great as the acute toxicity as measured in the mouse resulted in an $LD_{50}$ (S.C.) of about 1.2–1.6 g./kg. which is very slight. The therapeutic range for the products of the invention is particularly great as compared with comparison compounds.

The effective threshold dose for 2-[4-(β-o-methoxy-benzamido-ethyl) - benzene - sulfonamido]-5-isobutyl-pyrimidine was determined in the rabbit and via the i.v. route amounted to 0.1 mg./kg. For oral administration, the effective threshold dose similarly amounted to 0.1 mg./kg. (blood sugar decrease of 15–20%). In the extended time experiments, 2.5 mg./kg. i.v. in the rabbit was effective for at least 22 hours. In the dog, 0.1 mg./kg. both i.v. and oral was effective to produce a decrease in blood sugar. The effective threshold dose for 2-[4-(β-2-ethoxy-5-chloro-benzamido-ethyl) - benzene - sulfonamido]-5-isobutyl-pyrimidine was determined in the rabbit and via the i.v. route amounted to 0.0125 mg./kg. For oral administration the effective threshold dose of 2-[4-(β-2-methoxy-5-chloro-benzamido-ethyl) - benzene - sulfonamido]-5-isobutyl-pyrimidine amounted to 0.05 mg./kg.

TABLE I

| No. | Relative Blood Sugar Reducing Activity—Rabbit, i.v. | $LD_{50}$ s.c.—Mouse, g./kg. | |
|---|---|---|---|
| 1 | 80 | | 2-[4-(β-benzamido-ethyl)-benzene-sulfonamido]-5-propoxy pyrimidine. |
| 2 | 80 | | 2-[4-(β-p-chloro-benzamido-ethyl)-benzene-sulfonamido]-5-phenyl-pyrimidine. |
| 3 | 80 | | 2-[4-(β-hexahydro-benzamido-ethyl)-benzene-sulfonamido]-5-propoxy-pyrimidine. |
| 4 | 200 | >1.6 | 2-[4-(β-benzamido-ethyl)-benzene-sulfonamido]-5-propyl-pyrimidine. |
| 5 | 400 | | 2-[4-(β-benzamido-ethyl)-benzene-sulfonamido]-5-iso-butyl-pyrimidine. |
| 6 | 80–200 | | 2-[4-(β-p-chloro-benzamido-ethyl)-benzene-sulfonamido]-5-n-propyl-pyrimidine. |
| 7 | 400 | | 2-[4-(β-m-toluyl-amido-ethyl)-benzene-sulfonamido]-5-n-propyl-pyrimidine. |
| 8 | 800 | >1.2 | 2-[4-(β-m-chloro-benzamido-ethyl)-benzene-sulfonamido]-5-isobutyl-pyrimidine. |
| 9 | 80 | | 2-[4-(β-benzamido-ethyl)-benzene-sulfonamido]-5-n-butyl-pyrimidine. |
| 10 | 200 | | 2-[4-(β-p-methoxybenzamido-ethyl)-benzene-sulfonamido]-5-isobutyl-pyrimidine. |
| 11 | 2,000 | >1.0 | 2-[4-(β-o-methoxybenzamido-ethyl)-benzene-sulfonamido]-5-isobutyl-pyrimidine. |
| 12 | 400 | | 2-[4-(β-m-trifluoromethyl-benzamido-ethyl)-benzene-sulfonamido]-5-isobutyl-pyrimidine. |
| 13 | 80 | | 2-[4-(β-benzamido-ethyl)-benzene-sulfonamido]-5-isopropyl-pyrimidine. |
| 14 | 100 | | 2-[4-(β-benzamido-ethyl)-benzene-sulfonamido]-5-benzyl-pyrimidine. |
| 15 | 200 | 1.2–1.6 | 2-[4-(β-m-methoxybenzamido-ethyl)-benzene-sulfonamido]-5-isobutyl-pyrimidine. |
| 16 | 200 | | 2-[4-(β-2'-methoxy-5'-chlorobenzoyl-N-methylamino-ethyl)-benzene-sulfonamido]-5-isobutyl-pyrimidine. |
| 17 | 400 | | 2-[4-(β-2'-methoxy-5'-chlorobenzoyl-N-ethyl-aminoethyl)-benzene-sulfonamido]-5-isobutyl-pyrimidine. |
| 18 | 2,000 | | 2-[4-(β-o-ethoxybenzamido-ethyl)-benzene-sulfonamido]-5-isobutyl-pyrimidine. |
| 19 | 2,000 | | 2-[4-(β-o-methoxy-benzamido-ethyl)-benzene-sulfonamido]-5-(3-methyl-butyl)-pyrimidine. |
| 20 | 8,000 | | 2-[4-(β-2-methoxy-5-chloro-benzamido-ethyl)-benzene-sulfonamido]-5-isobutyl-pyrimidine. |
| 21 | 8,000 | | 2-[4-(β-5-methyl-2-methoxy-benzamido-ethyl)-benzene-sulfonamido]-5-isobutyl-pyrimidine. |

TABLE I—Continued

| No. | Relative Blood Sugar Reducing Activity— Rabbit, i.v. | LD₅₀ s.c.— Mouse, g./kg. | |
|---|---|---|---|
| 22 | 8,000 | | 2-[4-(β-5-bromo-2-methoxy-benzamido-ethyl)-benzene-sulfonamido]-5-isobutyl-pyrimidine. |
| 23 | 4,000 | | 2-[4-(β-5,2-dimethoxy-benzamido-ethyl)-benzene-sulfonamido]-5-isobutyl-pyrimidine. |
| 24 | 2,000–4,000 | | 2-[4-(β-5-fluoro-2-methoxy-benzamido-ethyl)-benzene-sulfonamido]-5-isobutyl-pyrimidine. |
| 25 | 16,000 | | 2-[4-(β-5-chloro-2-ethoxy-benzamido-ethyl)-benzene-sulfonamido]-5-isobutyl-pyrimidine. |
| 26 | 10 | | 2-benzene-sulfonamido-5-methoxy-ethoxy-pyrimidine. |

In normal clinical use, the compounds can be employed in both the free and the salt form. The activity of the compounds is independent of whether they are in salt form or otherwise. Salts may be prepared by any of the well-known standard methods. While the salt normally employed is the alkali salt and preferably the sodium salt, the compounds have been prepared in the form of other salts, such as potassium, ammonium, etc.

The products of this process may be combined with a pharmaceutical carrier for administration to humans in an amount to attain the desired blood sugar reducing effect. Such carriers are either solid or liquid. Exemplary of solid pharmaceutical carriers are lactose, cornstarch, mannitol, talc, etc. The compounds of this invention are mixed with a carrier and filled into hard gelatin capsules or tabletted with suitable tabletting aids, such as magnesium stearate, starch, or other lubricants, disintegrants or coloring agents. If combination with a liquid carrier is desirable, a soft gelatin capsule is filled with a slurry or other dispersion of the novel compounds in soya-bean, corn or peanut oil. Aqueous suspensions or solutions are prepared for alternate, oral or parenteral administration.

The dosage of the novel compounds of the present invention for the treatment of diabetes depends in the main on the age, weight, and condition of the patient being treated. The preferable form of administration is via the oral route in connection with which dosage units containing 5–500 mg. of active compound in combination with a suitable pharmaceutical diluent is employed. One or two unit dosages are good from one to four times a day.

We claim:

1. A compound selected from the group consisting of 2-benzene-sulfonamido-pyrimidines of the formula:

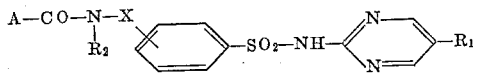

wherein X is alkylene containing from 1 to 4 carbon atoms, A is a member selected from the group consisting of substituted or unsubstituted alkyl having 1 to 5 carbon atoms wherein said substituent is a member selected from the group consisting of phenoxy and phenylmercapto; cyclohexyl and substituted or unsubstituted benzyl, toluyl and naphthyl wherein said substituent is from 1 to 3 members selected from the group consisting of halogen, lower alkyl, trifluoromethyl and lower alkoxy, $R_1$ is a member selected from the group consisting of alkyl having 1 to 5 carbon atoms, alkoxy having up to 4 carbon atoms, benzyl, hexahydrobenzyl, phenyl, chlorophenyl and cyclohexyl and $R_2$ is a member selected from the group consisting of hydrogen, lower alkyl having 1 to 3 carbon atoms and the pharmaceutically acceptable alkali salts thereof.

2. A compound according to claim 1 designated 2-[4-(β-o-ethoxybenzamidoethyl)-benzenesulfonamido]-5-isobutyl-pyrimidine or the pharmaceutically acceptable alkali salt thereof.

3. A compound according to claim 1 designated 2-[4-(β-o-methoxybenzamido-ethyl)-benzenesulfonamido]-5-(3-methylbutyl)-pyrimidine or the pharmaceutically acceptable alkali salt thereof.

4. A compound according to claim 1 designated 2-[4-(β-2-methoxy-5-chloro-benzamido-ethyl)-benzenesulfonamido]-5-isobutyl-pyrimidine or the pharmaceutically acceptable alkali salt thereof.

5. A compound according to claim 1 designated 2-[4-(β-o-methoxybenzamido-ethyl)-benzenesulfonamido]-5-(3-methylbutyl)-pyrimidine or the pharmaceutically acceptable alkali salt thereof.

6. A compound according to claim 1 designated 2-[4-(β-5-methyl-2-methoxy-benzamido-ethyl)-benzenesulfonamido]-5-isobutyl-pyrimidine or the pharmaceutically acceptable alkali salt thereof.

7. A compound according to claim 1 designated 2-[4-(β-5-bromo-2-methoxy-benzamido-ethyl)-benzenesulfonamido]-5-isobutyl-pyrimidine or the pharmaceutically acceptable alkali salt thereof.

8. A compound according to claim 1 designated 2-[4-(β-5,2-dimethoxy-benzamido-ethyl)-benzenesulfonamido]-5-isobutyl-pyrimidine or the pharmaceutically acceptable alkali salt thereof.

9. A compound according to claim 1 designated 2-[4-(β-5-fluor-2-methoxy-benzamido-ethyl)-benzenesulfonamido]-5-isobutyl-pyrimidine or the pharmaceutically acceptable alkali salt thereof.

10. A compound according to claim 1 designated 2-[4-(β-5-chloro-2-ethoxy-benzamido-ethyl)-benzene-sulfonamido]-5-isobutyl-pyrimidine or the pharmaceutically acceptable alkali salt thereof.

11. A compound according to claim 1 wherein $R_1$ represents alkyl having 3–5 carbon atoms, $R_2$ represents hydrogen, X represents $-(CH_2)_2$, and A represents

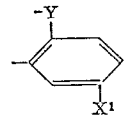

wherein Y is a member selected from the group consisting of hydrogen, alkyl and alkoxy having 1–3 carbon atoms and $X^1$ is alkoxy having 1–3 carbon atoms and the pharmaceutically acceptable alkali salts thereof.

References Cited

UNITED STATES PATENTS 3,198,706  8/1965  Ruschig et al. _____ 167—65
3,275,635  9/1966  Priewe et al. _____ 167—65

OTHER REFERENCES

Netherlands application, 64—11,087, March 1965.

ALEX MAZEL, Primary Examiner.

R. GALLAGHER, Assistant Examiner.

UNITED STATES PATENT OFFICE
CERTIFICATE OF CORRECTION

Patent No. 3,377,351                                April 9, 1968

Erich Haack et al.

It is hereby certified that error appears in the above numbered patent requiring correction and that the said Letters Patent should read as corrected below.

Column 3, line 38, "derivatves" should read -- derivatives --; line 39, "msut" should read -- must --. Column 4, line 52 and Column 5, lines 10 and 29, "ethyl", each occurrence, should read -- ethyl) --. Column 4, line 63, after "[" insert -- 4- --. Column 6, line 3, "lakaline" should read -- alkaline --; lines 5 and 6, "pydimidine" should read -- pyrimidine --; line 43, "pyridine" should read -- pyrimidine --. Column 7, lines 16 and 17, "benbene" should read -- benzene --. Column 8, line 1, "bene" should read -- zene --; line 4, "sulfonamide" should read -- sulfonamido --. Column 9, line 9, "benzylochloride" should read -- benzoylchloride --. Column 11, TABLE I-Continued, third column, line 13 thereof, "be zene" should read -- benzene --; same column, line 14 thereof, "et oxy" should read -- ethoxy --. Column 12, line 6, "benzenesulfonamidol" should read -- benzenesulfonamido --.

Signed and sealed this 9th day of September 1969.

(SEAL)
Attest:

EDWARD M. FLETCHER, JR.                     WILLIAM E. SCHUYLER, JR.
Attesting Officer                              Commissioner of Patents